United States Patent [19]

McCartney

[11] Patent Number: 5,033,909
[45] Date of Patent: Jul. 23, 1991

[54] COUPLING FOR ANCHOR ROD AND SLEEVE

[75] Inventor: Clifford A. McCartney, Salem, Va.

[73] Assignee: Ingersoll-Rand Company, Woodcliff Lake, N.J.

[21] Appl. No.: 515,945

[22] Filed: Apr. 27, 1990

[51] Int. Cl.$^5$ ............................................. E21F 20/02
[52] U.S. Cl. ..................................... 405/261; 405/260; 411/41
[58] Field of Search ........................ 405/259, 260, 261; 411/41, 40, 42

[56] References Cited

U.S. PATENT DOCUMENTS

| | | | |
|---|---|---|---|
| 2,952,129 | 9/1960 | Dempsey | 405/261 |
| 2,956,468 | 10/1960 | Macy | 411/41 |
| 3,683,740 | 8/1972 | Martin | 411/40 |
| 3,702,060 | 11/1972 | Cumming | 405/261 |
| 3,877,235 | 4/1975 | Hill | 405/261 |
| 3,896,627 | 7/1975 | Brown | 405/261 |

Primary Examiner—Dennis L. Taylor
Attorney, Agent, or Firm—Glenn B. Foster

[57] ABSTRACT

An apparatus to be inserted into a bore formed in a structure, includes a sleeve having an aperture. A rod is designed to be inserted into the aperture. A coupling maintains the rod substantially in axial alignment with the aperture prior to insertion of the sleeve into the bore. A recess, which is adapted to interfit with the rod, is disposed in the coupling to maintain the axial alignment. The coupling will not interfere with the insertion of the rod into the aperture. This insertion will cause the sleeve to be expanded into contact with a side of the bore.

15 Claims, 2 Drawing Sheets

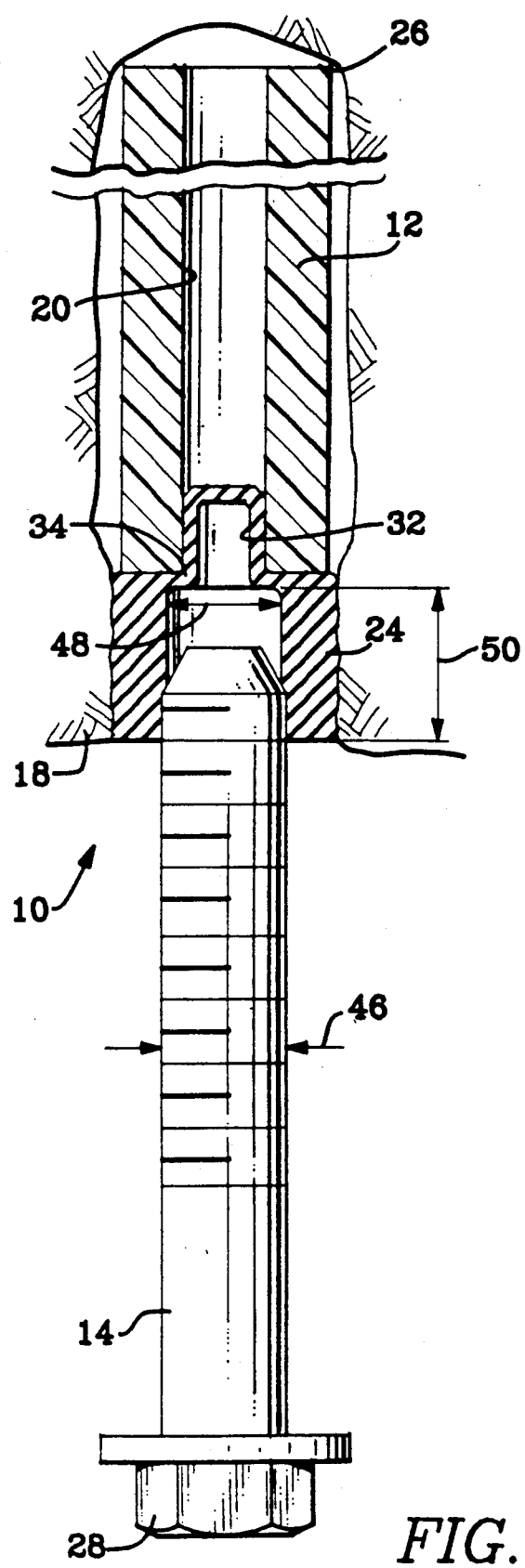
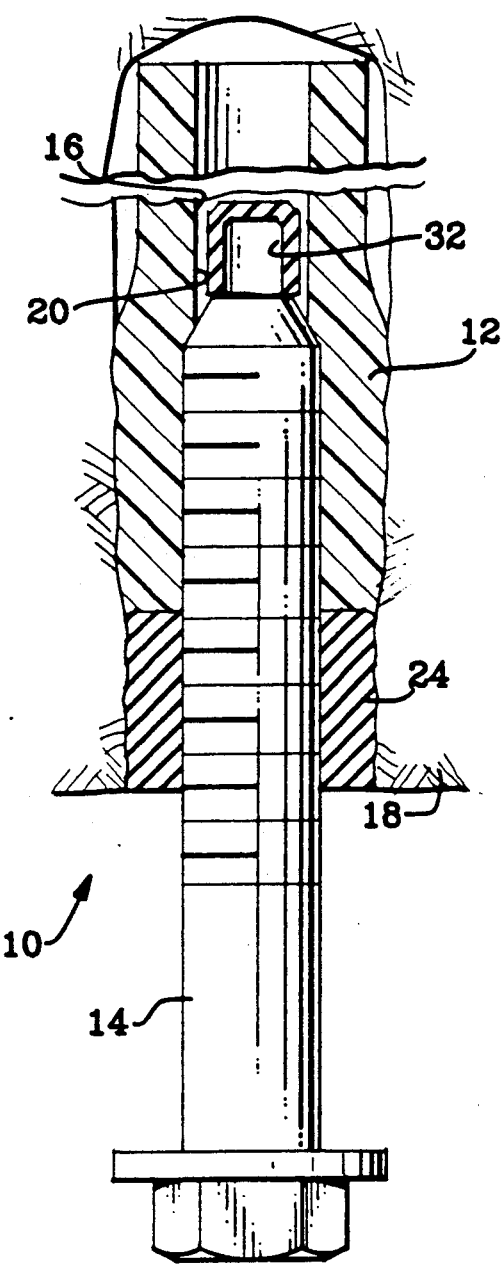
FIG. 1
FIG. 2

COUPLING FOR ANCHOR ROD AND SLEEVE

BACKGROUND OF THE INVENTION

This invention relates generally to a coupling means, and more particularly to a coupler to connect a sleeve and a bolt for a dynamic rock anchor prior to insertion into a bore formed in a structure.

One present method of installing a dynamic rock anchor system, including a sleeve and a rod, into a bore is to initially install the sleeve into the bore and then insert the rod behind the sleeve. In circumstances where the bore is in a ceiling which is higher than a person can reach, nothing will retain the sleeve in the bore before the rod is inserted. A complex ladder or scaffold system is required so a person can manually insert the sleeve; this is labor intensive.

The foregoing illustrates limitations known to exist in present anchors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus to be inserted into a bore formed in a structure comprising a sleeve having an aperture. A rod is designed to be inserted into the aperture. The coupling maintains the rod substantially in axial alignment with the aperture prior to insertion of the sleeve into the bore.

The foregoing and other aspects will become apparent from the following detailed description of the invention when considered in conjunction with the accompanying drawing figures.

BRIEF DESCRIPTION OF THE DRAWING FIGURES

FIG. 1 is a partially cross sectional view illustrating an embodiment of a rod coupled to a sleeve by the coupling means of the instant invention, during insertion of the rod, sleeve and coupling into a bore; in this embodiment, a diameter of a relaxed recess in the coupling means is less than the diameter of the rod;

FIG. 2 is a view similar to FIG. 1, with the rod and sleeve in a partially installed position in the bore;

DETAILED DESCRIPTION

Figure 3:
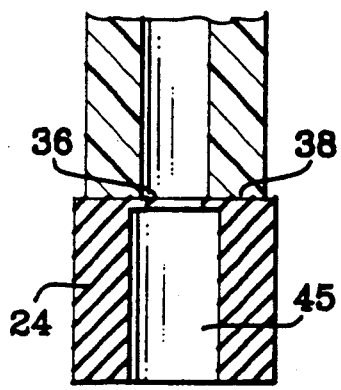
FIG. 3 is a side cross sectional view of the connected sleeve and coupling means of an alternate embodiment of the invention.
Figure 4:
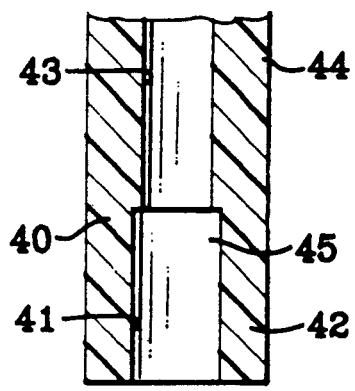
FIG. 4 is a view similar to FIG. 3, of yet another alternate embodiment of the invention.
Figure 5:
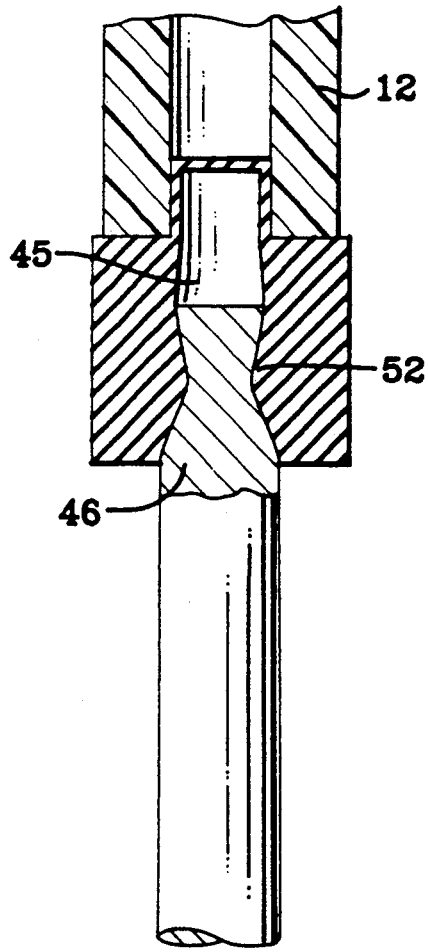
FIG. 5 is a view similar to the coupling means portion of FIG. 1, illustrating a coupling means formed with deformations.
Figure 6:
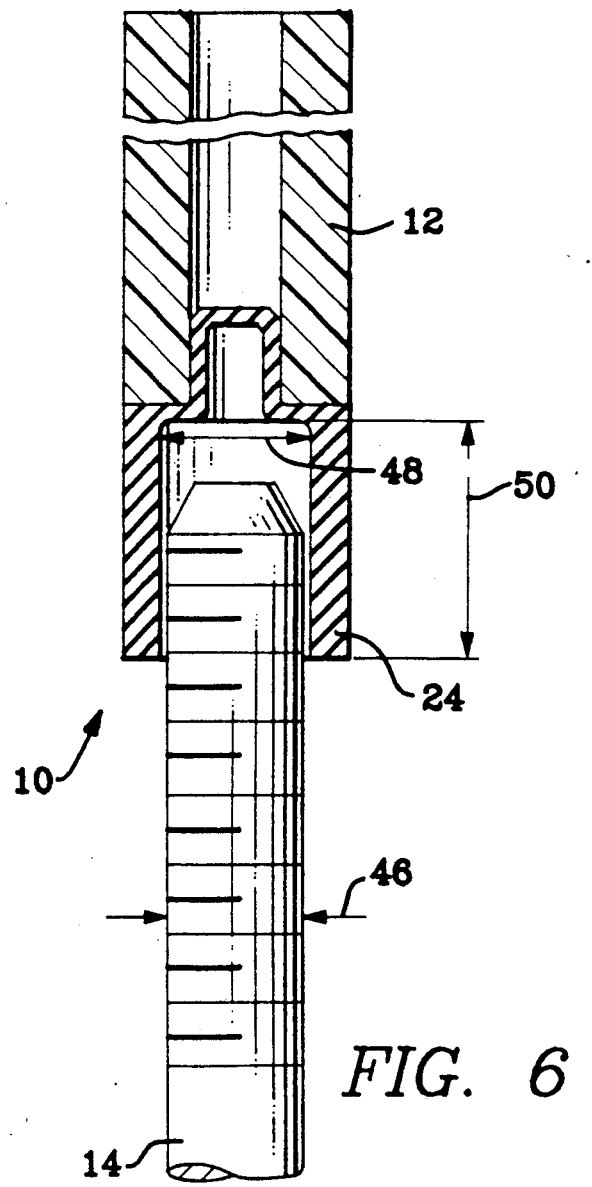
FIG. 6 is a partial cross sectional view illustrating another embodiment of the coupling means similar to FIG. 2, except where the diameter of the relaxed recess is greater than the diameter of the rod.

An anchor 10 includes a sleeve 12 and a rod means 14. To anchor the anchor 10 in a bore 16 formed in a structure 18 (such as a mine roof), the sleeve 12 is placed in the bore 16. The rod 14 is then forced into an aperture 20 formed in the sleeve, which expands an external wall 20 into a restraining contact with the bore 16.

In order to simplify the insertion of the earth anchor 10, especially in those instances where the bore is out of reach of the person inserting the anchor, a coupling means 24 is used to couple the rod 14 with the sleeve 12 into one unitary member which can be inserted into the bore 16.

In this manner, the position of one end 25 of the sleeve 12 can be controlled by moving another end 28 of the rod 14. Also, once the sleeve 12 is placed in the bore 16, the rod 14 and coupling means 24 will interact to prevent the sleeve 12 from falling out of the bore 16, unless it is desired.

The coupling means includes an attachment portion 30 to connect the coupling means to the sleeve. The coupling means must be attached to the sleeve in such a manner that when the anchor is in the bore 16, the rod means 14 is axially aligned with the aperture 20. The coupling means 24 must not interfere with the rod 14 entering the aperture 22.

In this manner, when the anchor 10 is in the bore 16, the rod has to be forced forward to cause the rod to enter the aperture 20. The rod may be formed with a smooth external surface, in which case the rod will have to be pressed directly into the aperture 20; or the rod may be formed with a threaded outer surface in which case forward pressure along with rotation will cause the rod to enter the aperture 20.

An attachment portion or coupler 30 may be formed with a cap portion 32. The cap portion fits directly in the aperture 20 to attach and center the coupling 24 with respect to the sleeve 12. A fracture region 34 is included such that when the rod 14 is forced into the aperture, the fracture region will split, and the cap will be forced up the aperture by the rod.

Alternately, the coupling means 24 may be formed with a orifice 36 formed in an attachment wall 38. The attachment wall 38 is affixed directly to the sleeve 12 (with an adhesive or other connecting device). When the rod 14 is inserted into the coupling means 24, upward force of the rod 14 with respect to the coupling 24 will cause the rod to pass through the orifice 36, and into the aperture.

Also, the coupling means 24 and the sleeve 12 may be formed as a unitary member 40. In this configuration, the aperture portion 41 of the coupling portion 42 will be larger than the aperture portion 43 of the sleeve portion 44. This coupling means 24 functions identically to that described in the prior paragraph.

The coupling means 24 includes a recess 45 to connect the coupling means to the 14. A cross sectional configuration (for example a diameter) 46 of the rod 14 may be equal, larger or smaller than a cross sectional configuration 48 of the recess 42.

In those circumstances where the cross sectional configuration of the rod 46 exceeds the cross sectional configuration of the recess 48 (as shown in FIGS. 1 and 2), the rod will generally be securely held in place by a deformative force of the recess upon the rod 14. For this reason, a necessary depth 50 of the recess is relatively shallow.

An alternate configuration would be to form the recess 45 with deformations 52 to mate with contours on the cross sectional configuration 46 of the rod. In this manner, when the rod is fully inserted into the recess 45, it will be temporarily locked in position.

In those circumstances where the cross sectional configuration of the rod 46 is less than the cross sectional configuration of the recess 48 (as shown in FIG.

5), the necessary depth 50 of the recess 45 is relatively deep such that the sleeve 12 will be prevented from angling out of coupling engagement with the rod. When the cross sectional configurations of the rod and recess 46, 48 are equal, the necessary depth 50 is somewhere between the aforementioned two circumstances.

It is envisioned that the coupling means may be formed from a plastic, elastomeric, metal or other material. The material chosen must be rigid enough to provide support for the sleeve.

It is also envisioned that the coupling means 24 could be placed on the rod means, and then the integral rod means and coupling means could be affixed to the sleeve 12.

Having described the invention, what is claimed is:

1. An apparatus to be inserted into a bore formed in a terrestrial structure causing securement of said terrestrial structure, comprising:
    an elongated first sleeve having an aperture, insertable into the bore and radially expandable against the wall of the bore along a substantially axial length of the sleeve;
    elongated rod means, separate from the sleeve prior to insertion, for insertion into the aperture, wherein the rod means is maintained in position after insertion to assist in said securement; and
    coupling means distinct from said first elongated sleeve including a second sleeve which is coaxial with said first sleeve and interacting between the rod and the sleeve for maintaining the rod substantially in axial alignment with the aperture prior to insertion of the sleeve into the bore.

2. The apparatus as defined in claim 1, wherein the coupling means will not interfere with the insertion of the rod means into the aperture.

3. The apparatus as defined in claim 1, wherein the coupling means and the sleeve are formed as one unitary member.

4. The apparatus as defined in claim 1, wherein the coupling means is affixed to the sleeve.

5. The apparatus as described in claim 4, wherein an adhesive is used to affix the coupling means to the sleeve to resist articulation between the two members.

6. The apparatus as defined in claim 1, wherein the coupling means is affixed to the rod means.

7. The apparatus as defined in claim 1, further comprising:
    a centering means for centering the coupling means with respect with the aperture.

8. The apparatus as defined in claim 7, wherein the centering means comprises a cap portion.

9. The apparatus as defined in claim 1, further comprising:
    a recess means, adapted to interfit with the rod means, disposed in the coupling means for maintaining the rod in axial alignment with the aperture.

10. The apparatus as defined in claim 9, wherein an original cross section of the recess means equals an original cross section of the rod means.

11. The apparatus as defined in claim 9, wherein an original cross section of the recess means is less than an original cross section of the rod means.

12. The apparatus as defined in claim 9, wherein an original cross section of the recess means is greater than an original cross section of the rod means.

13. The apparatus as defined in claim 1, wherein a portion of the coupling means surrounding the recess is formed with a deformations which interlock with the rod when the coupling is coupled to the rod.

14. An apparatus to be inserted into a bore formed in a terrestrial structure resulting in securement of the terrestrial structure comprising:
    an elongated sleeve having an aperture, insertable into the bore;
    an elongated rod member, separate from the sleeve prior to insertion, insertable into the aperture formed in the sleeve, wherein the rod is maintained in axial alignment with the aperture formed in the sleeve prior to insertion;
    a coupler having a recess encasing the rod member wherein relative articulation between the rod and the coupler, prior to insertion, is limited; and
    connector means interacting between the rod and the sleeve for limiting relative articulation between the coupler and the rod prior to insertion.

15. An apparatus to be inserted into a bore formed in a terrestrial structure resulting in securement of the terrestrial structure, comprising:
    an elongated expandable sleeve insertable into the bore having an aperture formed therein, the aperture having a first circumferential dimension;
    an elongated rod member, separate from the sleeve prior to insertion, having a second circumferential dimension greater than the first circumferential dimension, which disposed within the aperture, causes the sleeve to be expanded into engagement with the bore resulting in said securement;
    a coupler having a recess encasing the rod member wherein relative articulation between the rod and the coupler, prior to insertion, is limited, the recess having a third circumferential dimension which is equal to, or larger than, the second circumferential dimension; and
    connector means for limiting relative articulation between the coupler and the rod prior to insertion, wherein the rod is maintained in alignment with the aperture prior to insertion.

* * * * *